US012806650B2

(12) United States Patent
Färber et al.

(10) Patent No.: US 12,806,650 B2
(45) Date of Patent: Nov. 24, 2026

(54) SYSTEM FOR THE APPLICATION OF A COATING FILM AND METHOD

(71) Applicant: PPG Industries Ohio, Inc., Cleveland, OH (US)

(72) Inventors: Peter Färber, Gärtringen (DE); Marcel Grübel, Schwieberdingen (DE); Daniel Mencel, Esslingen (DE); Frank Rakel, Unterensingen (DE); Holger Bernd Salzer, Kornwestheim (DE)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 18/693,810

(22) PCT Filed: Sep. 15, 2022

(86) PCT No.: PCT/EP2022/075626

§ 371 (c)(1),
(2) Date: Mar. 20, 2024

(87) PCT Pub. No.: WO2023/041633

PCT Pub. Date: Mar. 23, 2023

(65) Prior Publication Data

US 2024/0390929 A1 Nov. 28, 2024

(30) Foreign Application Priority Data

Sep. 20, 2021 (DE) ..................... 10 2021 210 437.1

(51) Int. Cl.
*B05C 1/02* (2006.01)

(52) U.S. Cl.
CPC ...................................... *B05C 1/02* (2013.01)

(58) Field of Classification Search
USPC ................. 118/500, 501, 503, 200, 261–264
See application file for complete search history.

(56) References Cited

U.S. PATENT DOCUMENTS 3,671,362 A 6/1972 Pierce et al.
4,103,615 A * 8/1978 Cruz .................. B41F 15/0836 101/115

(Continued)

FOREIGN PATENT DOCUMENTS

AU 622198 B2 4/1992
CN 1364111 A 8/2002

(Continued)

OTHER PUBLICATIONS

International Search Report and Written Opinion received for PCT Application Serial No. PCT/EP2022/075626 dated Apr. 6, 2023, 14 pages.

(Continued)

*Primary Examiner* — Yewebdar T Tadesse

(57) ABSTRACT

A system is proposed for the application of a coating film to a surface of a component to be painted, which system is suitable in particular for semi-automatic or fully automatic application of the coating film. The system comprises a framework in which the coating film can be fixed and which is used to position the coating film over the surface to be painted. Furthermore, the system comprises at least one application means, for example a squeegee, with which a contact pressure is exerted on the coating film during application. Furthermore, the system comprises two rails along which the at least one application means can be moved. Furthermore, the system comprises a device for fixing the coating film in the framework. Furthermore, the system comprises means for positioning and/or fixing the framework to the component. Furthermore, the invention provides a method for applying a coating film to a surface of a component using said system.

17 Claims, 3 Drawing Sheets

(56) References Cited

U.S. PATENT DOCUMENTS

| | | | | | |
|---|---|---|---|---|---|
| 4,246,866 | A * | 1/1981 | Hopings | ............ | B41F 15/0818<br>101/421 |
| 2014/0083359 | A1* | 3/2014 | Miyake | .............. | B41F 15/0881<br>118/500 |
| 2020/0198223 | A1 | 6/2020 | Sorensen et al. | | |
| 2020/0198918 | A1 | 6/2020 | Fujino et al. | | |

FOREIGN PATENT DOCUMENTS

| | | | | | |
|---|---|---|---|---|---|
| DE | 2312026 | C3 | 11/1975 | | |
| DE | 2611096 | A1 | 10/1976 | | |
| DE | 68903896 | T2 | 6/1993 | | |
| DE | 29503778 | U1 | 5/1995 | | |
| DE | 19606395 | C1 | 10/1997 | | |
| DE | 19812402 | A1 | 9/1999 | | |
| DE | 102007040376 | A1 | 2/2009 | | |
| JP | 06-255873 | A | 9/1994 | | |
| JP | 09-226007 | A | 9/1997 | | |
| KR | 10-2011-0038243 | A | 4/2011 | | |
| WO | 01/05902 | A2 | 1/2001 | | |
| WO | 2020/148070 | A1 | 7/2020 | | |
| WO | WO-2022239841 | A1 * | 11/2022 | ............ | B05C 13/02 |

OTHER PUBLICATIONS

Office Action issued Feb. 28, 2022, in German application 102021210437.1.

* cited by examiner

SYSTEM FOR THE APPLICATION OF A COATING FILM AND METHOD

The present invention relates to a system for applying a coating film to a surface of a component and to a method using the system.

FIELD OF APPLICATION AND STATE OF THE ART

As an alternative to conventional coating methods, in which solvent-based or solvent-free liquid coatings or powder coatings are used, transfer coating techniques have been known for some time which use a layered composite with a carrier layer, in particular a flexible carrier layer, and at least one coating layer for transferring the coating to a workpiece. The layered composite can be provided, for example, as a sheeting material. For application of the coating, the layered composite is, for example, applied with the side containing the coating layer to the workpiece to be coated, wherein an adhesion-promoting layer is optionally also used between the workpiece and the coating layer. Following adhesion of the coating layer to the surface of the workpiece, the carrier layer, for example, a plastic film, can be peeled off and removed, wherein the coating layer or layers remain on the workpiece. Self-adhesive coating films can also be used for such transfer coating techniques.

For example, DE 10 2007 040 376 A1 describes a method in which a layered composite with a coating layer is used to coat a substrate, in particular to paint a vehicle body.

The use of coating films is becoming increasingly widespread, particularly in vehicle production. However, the application of coating films is anything but trivial, especially in mass production. The larger the coating film, the more difficult it is to position it correctly on the intended surface and to apply it without air pockets or wrinkles. Automation of these processes has not yet been achieved. Instead, in the mass production of motor vehicles, the application of coating films, or adhesive films in general, is still essentially carried out manually with the aid of hand squeegees.

WO 2020/148070 A1 discloses a method and a tool for applying an adhesive film to the surface of a workpiece, which address the mentioned problems. An adhesive film with an adhesive layer is positioned by means of an automated system between the surface to be adhered to and an elastic membrane. As a result of a negative pressure applied between the membrane and the surface, the membrane arches toward the surface, forming a convex side and a concave side, until it initially contacts the surface with the convex side, such that the adhesive layer of the adhesive film is pressed by the membrane onto the surface over its entire surface. The degree of arching of the membrane can be controlled by matching the pressure ratios on both sides of the membrane. For example, it is possible to support the arch of the membrane produced through application of the negative pressure by applying a corresponding positive pressure on the back side of the membrane.

This approach produces excellent results with solid, structurally reinforced workpieces. However, problems can arise if, for example, a very thin, flexible sheet metal is to be coated. In such cases, the application of the aforementioned vacuum can deform not only the membrane but also the sheet metal under certain circumstances, so that this approach is not suitable in all cases.

A related method, which is nevertheless very different in details, is known from DE 198 12 402 A1. This patent application deals with the application of films to, for example, car body panels. For this purpose, the film to be applied is converted into a convex shape and pressed against the surface to be coated. This is done with the aid of a framework in which a membrane is clamped and to which membrane the film is fixed. The foil is pressed on by means of negative pressure.

The main disadvantage of these prior art methods is that they require a relatively complex method of generating a negative pressure and the corresponding devices for this purpose. In addition, adaptation to varying geometries of the workpiece to be painted is difficult.

Task and Solution

In contrast, the invention sets itself the task of providing a system, that is very simple and easy to use in practice, for the application of films and, in particular, coating films to a component. The system should be, in particular, suitable for vehicle production and should permit the application of coating films without great effort and with good quality, in particular, without air pockets, imprints or wrinkle formation. Above all, the system should also enable the simple and error-free application of films in mass production and in a semi- or fully-automated production line.

This task is, in particular, solved by a system as it results from claim 1. Preferred embodiments and further developments of the system result from the claims that are dependent on claim 1.

Furthermore, this task is solved by a method according to claim 13 and in a further development according to claim 14.

The system according to the invention for the application of a film, in particular a coating film, to a surface of a component to be painted, is characterized by the following features:

a. The system comprises a framework in which the film, in particular the coating film, can be fixed and which serves to position the film, in particular the coating film, over the surface to be painted.
b. The system comprises at least one application means with which a contact pressure is exerted during application on the film, in particular on the coating film.
c. The system comprises two rails along which the at least one application means is movable.
d. The system comprises a device in the framework for fixing the film, in particular the coating film.
e. The system comprises means for positioning and/or fixing of the framework to the component.

The invention thus provides an application system or application unit guided on two rails for applying form-fitted film products to the surface of a component and can be used, for example, for applying self-adhesive coating films, for example, self-adhesive decorative coating films or other coating films. This system allows semi-automated and also fully automated application of the film products, while at the same time achieving application without air pockets, wrinkles, distortions or the like, such that a consistently good quality of the resulting products is ensured.

In particular, the application with the system according to the invention can be carried out much faster when compared to a manual application of coating films, wherein a very good and consistent quality of the application can be achieved at the same time. The system can therefore be used to great advantage in mass production and in automatic production lines. Reproducible film transfer without fault patterns is ensured, which is to say, in particular without air pockets or other application defects.

The system according to the invention enables, for example, reproducible positioning of prefabricated coating films on the transfer surface.

The system according to the invention can be adapted for different applications, such that, in particular, an application of high-quality films with, for example, Class A surfaces is also possible on different substrates, for example on painted body parts or plastic add-on components. The system allows for an optimization of the application and transfer process, with savings in both time and personnel.

The system also permits contour-adapted application of the films, in particular self-adhesive coating films, which can be specially adapted to the respective surface geometry, for example, to the shape of the body or to the shape of various vehicle add-on components.

The application of coating films is particularly interesting, among other things, against the backdrop of the increasing demand for individualization of motor vehicles and also, for example, for two-tone finishes. Up to now, it has been difficult to apply a coating film precisely and without application errors, especially on large planar surfaces such as a vehicle roof. Traditionally, coating films are applied by hand using a hand squeegee, usually requiring several people to hold the film to be applied in the appropriate position. A clean application is very important, since otherwise, for example, squeegee marks or air pockets occur, which would be very unsightly on large surfaces and especially on reflecting surfaces.

With the system according to the invention, film application can be carried out reliably, especially on large surfaces, without requiring a large number of personnel and with assured good quality. The system works with a framework in which the coating film is fixed. This framework is positioned and fixed to the component to be painted. The essence of the system lies above all in the fact that the film is pressed evenly and in an automated manner onto the surface to be painted by means of an application means that can be moved on two rails of the framework.

In particularly preferred embodiments, the system according to the invention is characterized by at least one of the following additional features:

a. The framework has a rectangular basis shape.
b. The two rails are two opposite side parts of the framework.
C. The two rails are fixed on two opposite side parts of the framework.
d. The rails are linear rails.
e. The rails run parallel to each other.

Preferably, the aforementioned features a., b., d. and e. or a., c., d. and e. are realized in combination with each other.

The embodiment of the framework with a rectangular basic shape and the linear rails on two opposite sides of the framework is particularly advantageous for those cases in which the film to be applied also has a rectangular shape. However, the system can also be adapted to other cases, in particular those in which a film with a different geometry is to be applied, for example, also films with curved edges or other films with a design deviating from a rectangular shape. In these cases, on the one hand, the shape of the framework and, on the other hand, optionally also the shape of the rails provided for the method of application means may be formed in a different shape.

In a particularly preferred manner, the framework of the system according to the invention is characterized by at least one of the following further features:

a. The framework is a variably adjustable framework.
b. The framework is composed of system profiles.
c. The framework is composed of aluminum profiles.

Preferably, the above features a. and b. or a. and c. or a. and b. and c. are implemented in combination with each other.

The preferred design of the framework as a variably adjustable framework provides the particular advantage that the system, in this form, can be adapted to different requirements. In particular, the framework can be enlarged or reduced in size in order to apply films of different sizes.

The use of system profiles for the construction of the framework is particularly advantageous, since such profiles are available in a standardized manner and can be assembled with little effort and in a variable manner. Corresponding structural profiles made of aluminum are particularly suitable, as they are very lightweight on the one hand and easy to process on the other. A suitable system is, for example, the profile system from Item Industrietechnik GmbH.

In preferred embodiments, the system according to the invention is characterized by at least one of the following additional features:

a. The at least one application means is or comprises a squeegee.
b. The at least one application means is or comprises a brush, preferably a rotatable brush.
c. The at least one application means is or comprises a roller, preferably a rotatable roller.

In a particularly preferred embodiment of the system according to the invention, the application means is or comprises a squeegee according to the aforementioned feature a.

A squeegee is a tool that is per se known, which is already used in conventional procedures for applying a film, wherein a squeegee with a certain working width can be used to press the film onto the substrate and smooth it out. The squeegee is, for example, a rectangular, flat element, which is usually drawn over the film to be smoothed out at a certain angle.

In conventional, manual application methods, a squeegee, in the form of a hand squeegee, is pulled over the film. In the system according to the invention, the squeegee is used in such a way that it is methodically guided along the rails of the system, exerting a uniform contact pressure on the film to be applied. In this way, a predefinable and very uniform pressure can be applied over a surface such that the coating film can be applied in an optimum manner. The squeegee is inserted into the system in such a way that the squeegee is preferably guided over the surface at a leading, acute angle. The acute angle refers to the angle between the substrate, which is to say the surface of the component, and the squeegee.

In alternative embodiments, the application means may be or comprise a brush according to the aforementioned feature b. or the application means may be or comprise a roller according to the aforementioned feature c. Rotatable brushes and/or rotatable rollers are particularly suitable.

In some embodiments, multiple application means may be combined. For example, a brush may initially be passed over the film to be applied, before being followed by a squeegee, or vice versa. Under certain circumstances, particularly good results can be achieved with these embodiments.

In particularly preferred embodiments, the application means, for example the squeegee, has a certain flexibility in the area where it comes into contact with the film. This area of the squeegee can, for example, be formed from a rubber material or a similar flexible material. This embodiment is particularly advantageous because it can be used to follow various curvatures of the surface of the component to which the film is to be applied, such that optimal application of the film is achieved even with difficult geometries of the component surface.

In embodiments in which a brush or a roller is used as the application means, a certain flexibility of the brush or the roller is preferably also provided in order to allow adaptation to the geometry of the surface of the component to be coated.

In particularly preferred embodiments, with respect to the squeegee, the system according to the invention is characterized by at least one of the following additional features:

a. The squeegee can be moved along the rails in such a way that it is guided over the film, in particular the coating film, at a leading, acute angle during application of the film.
b. During application of the film, the squeegee is covered with a textile fabric, in particular a felt, in the area that comes into contact with the film, in particular the coating film.
c. During application of the film, in the area that comes into contact with the film, in particular the coating film, the squeegee has a pneumatically or hydraulically actuable element, in particular a hose made of elastic material.

In a particularly preferred manner, the aforementioned features a. and b. and further preferably the aforementioned features a., b. and c. are implemented together with each other.

A particularly uniform and constant contact pressure is achieved due to the leading, acute angle of the squeegee over the film, such that the film can be applied very uniformly to the surface.

By covering the area of the squeegee that comes into contact with the film with a textile fabric, it is possible to ensure that the pressing on by means of the application means is very gentle on the film. In particular, this prevents scratches or other damage during the pressing on of the film. A felt, for example, is particularly suitable for this purpose. Other materials, for example, a rubber cover or similar, can also be used in this context.

The textile fabric can, for example, be retained on the actual squeegee with sheet metal. The sheet metal in the form of sheet metal rails can, for example, be screwed tightly onto the squeegee.

In a particularly preferred embodiment, in the area coming into contact with the film to be applied in accordance with the aforementioned feature c., the squeegee comprises a dynamic, actuable element, for example a hose, which is used for pressure adjustment of the squeegee. The pressure exerted by means of the squeegee is thereby flexibly adjustable and can be adapted to the respective conditions during application of the film. The hose can, for example, be filled with air, which is accordingly supplied or discharged in order to vary the pressure in the hose and thus the contact pressure. Such a hose or another comparable element can, for example, be guided over the sheet metal with which the textile fabric is fixed to the squeegee. This embodiment allows particularly good adaptation of the film to the contour of the car body during application, especially when complex geometries to which the film is to be applied are involved.

The squeegee itself can, for example, be made of plastic. A flexible plastic or, for example, rubber may be used. In other embodiments, a portion of the squeegee may be made of a solid material, such as metal or wood, and a portion may be made of a flexible material. Expediently, the part of the squeegee facing the film to be applied is made of a flexible material.

In further preferred embodiments, the system according to the invention is characterized by at least one of the following additional features:

a. The application means comprises at least one, preferably two, pressure cylinders for generating the contact pressure on the film, in particular the coating film.
b. The at least one pressure cylinder is designed and/or arranged to press the squeegee onto the surface to be painted.
c. The at least one pressure cylinder is a hydraulic cylinder.
d. The at least one pressure cylinder is a pneumatic cylinder.

With the aid of one pressure cylinder or preferably with the aid of two, for example laterally arranged pressure cylinders, the application means can be guided in a particularly advantageous manner with an appropriate contact pressure over the film to be applied. In this, the use of, for example, two pressure cylinders is suitable both for a squeegee as an application means as well as for other application means, such as a roller brush or a roller.

Conventional pressure cylinders can be used as pressure cylinders, in particular hydraulic cylinders and/or pneumatic cylinders. In this case, the pressure cylinders can be suspended, for example, on both sides of the squeegee or brush or roller in such a way that they are connected to the front area of the squeegee, which is guided over the film, such that the squeegee can be guided over the film to be applied with a uniform contact pressure, but variable angle if necessary.

In a particularly preferred embodiment, the system is characterized by the following feature.

a. The system includes a pressure sensor system.

A pressure sensor system in the system allows continuous monitoring of the contact pressure when the application means is applied over the film to be applied and corresponding regulation of the exerted contact pressure. In this way, a constant contact pressure can be achieved during the application of the coating film on the surface of the component. This measure enables particularly uniform application of the film to the surface of the component. In particular, this embodiment can be very helpful for complex geometries of the surface of the component. Conventional sensors known to those skilled in the art can be used as pressure sensors.

In the case of less complex geometries of the surface of the component, for example, in the case of an only slightly curved car roof or similar, it may be possible to dispense with a pressure sensor system without compromising the quality of the application of the film.

In preferred embodiments, the system according to the invention is characterized by at least one of the following additional features:

a. The means for positioning and/or fixing the framework to the component are, or comprise, at least two, preferably three, pneumatically or hydraulically operable cushions, in particular inflatable air cushions.
b. The means for positioning and/or fixing the framework to the component are, or comprise, pins on the framework which are provided for engagement in openings in the component.

For correct application of the film to the surface of the component, it is important that the framework of the system, which supports the film and which allows the guidance of the application means by means of the rails provided, is correctly positioned and fixed to the component.

In accordance with the aforementioned feature a., a plurality of cushions may, in particular, be provided for positioning and/or fixing the framework, which cushions are attached to the framework and which are, for example, inflatable and which thus exert a contact pressure such that the framework can be securely and stably fixed to the component. The design of the positioning and fixing means as cushions also ensures a certain flexibility so that damage to the component, for example, scratches to sensitive surfaces, is not caused by the attachment of the framework.

Alternatively, or in addition to such cushions, further measures can be taken to position and/or fix the framework to the component. According to the aforementioned feature b., pins on the framework which are inserted into corresponding openings of the component are particularly suitable for this. For this purpose, openings of the component can be used which are already present for other reasons, such that no additional drillings or the like need to be made in the component. The corresponding pins on the framework of the system according to the invention can then be attached at the corresponding position to the framework. In this way, fixing and positioning can be carried out in a simple manner. This embodiment is particularly suitable for automation when attaching the framework, for example, in motor vehicle construction.

In a particularly preferred manner, these two possibilities according to the aforementioned features a. and b. are implemented in combination with each other.

In preferred embodiments, with respect to the attachment of the film or the clamping of the film in the framework, the system according to the invention is characterized by at least one of the following additional features:

a. The device for fixing the coating film in the framework comprises means, in particular clamping means, for fixing the coating film to two opposite sides of the framework.
b. The device for fixing the coating film comprises means for tensioning the coating film, in particular tension springs.

Preferably, the two aforementioned features a. and b. are implemented in combination with each other.

By means of these measures, the film, in particular the coating film, can be clamped in the framework in a simple manner. A further tensioning of the film after the actual fastening of the film in the framework is particularly advantageous. Sufficient tensioning of the film can be very helpful in preventing premature contact of the film with the surface of the component, such that the first contact of the film with the surface of the component does not occur until operation of the single or multiple application means in the desired and intended manner. Sufficient tensioning thus prevents the film from adhering, in advance, in undesirable places to the surface of the component.

In preferred embodiments, with respect to the film to be applied, in particular the coating film to be applied, the system according to the invention is characterized by at least one of the following additional features:

a. The film is a self-adhesive film, in particular a self-adhesive coating film.
b. The film is a transfer coating film.
C. The film comprises a color-imparting layer.
d. The film includes a clear coat layer.
e. The film comprises a color-imparting layer and a clearcoat layer.

The aforementioned feature a., according to which the film to be applied is a self-adhesive film, in particular a self-adhesive coating film, is very particularly preferred. The application of self-adhesive films has, in particular, up to now, always been difficult, since a preliminary contact of the film to be applied is often hardly avoidable, especially in the case of a manual application of the film, which leads to unsightly results in the application of the film. By fixing and, in particular, by clamping the film in the framework of the system according to the invention, such preliminary contact is reliably avoided with the system according to the invention, such that self-adhesive films, which are generally difficult to process, can be processed particularly well with the system according to the invention.

In principle, different types of films can be applied with the system according to the invention. Both color-imparting films and, for example, films with a clear coat layer or combinations thereof can be applied. The system according to the invention is thus particularly suitable for motor vehicle construction or bodywork construction, where, for example, contrasting colors or even the actual car colors are applied to the corresponding components by means of the film to be applied with the system according to the invention.

The film to be applied is a transfer coating film according to the above-mentioned feature b. in particularly preferred embodiments. In general, transfer coating films are a layered composite comprising a carrier layer, in particular a flexible carrier layer, and at least one coating layer. The flexible carrier layer can, for example, be a conventional film that is conventionally used for transfer coating films.

The carrier layer of the transfer coating film is preferably a plastic film, in particular a plastic film with a uniform thickness of between 30 and 300 μm, in particular between 100 and 150 μm, especially of approximately 120 μm. The plastic film can be made of non-polar plastics, for example from the group of polypropylenes or phenoplastics.

One or more common coating layers which are used in transfer coating technology may also be the at least one coating layer. The coatings may, for example, be polyurethane coatings. A preferred example are coatings based on acrylated urethane. In the simplest case, the at least one coating layer is a layer of a clear coating or a layer of a coating containing color pigments. Combinations are, however, also possible. For example, a first coating layer of a preferably scratch-resistant clear coating can be arranged directly on the carrier layer. This clearcoat layer can be covered with a second layer of a coating containing color pigments.

The at least one coating layer preferably has a uniform layer thickness in the range of 10-1000 μm, preferably in the range of 10-500 μm, particularly preferably in the range of 10-100 μm.

Preferably, the coating layer(s) of the transfer coating film is/are already fully cured and/or crosslinked before the transfer coating film is applied by means of the system according to the invention. In some cases, however, it may also be preferred that the coating layers contain, at least in some areas, uncrosslinked constituent parts that can be cured after application of the transfer coating film, for example, by radiation.

In some embodiments, when using the system according to the invention, it may be provided that a self-adhesive film is not used, but rather a coating film or other film that is fixed to the surface of the component by means of an adhesion-promoting layer. The adhesion-promoting layer can be applied to the film itself or to the surface of the component. Adhesive layers commonly used in transfer coating techniques can be used for this purpose, for example, based on polyurethane or others.

When transfer coating films are used, it may be provided that the carrier layer is peeled off after the film has been applied to the component.

Furthermore, it may be provided that after the film has been applied and, optionally, after the carrier layer has been removed, a further layer, in particular a further coating layer, for example, a clearcoat layer, is applied to the surface of the component or another final treatment of the coating is carried out.

If a coating film is used with a clearcoat layer already present in accordance with the aforementioned feature d. or e., a further coating or recoating after application of the film is generally not required.

In preferred embodiments, when the film that is applied with the system according to the invention is formed as a self-adhesive coating film, the film may be characterized by at least one of the following features a. to h.:

a. The film comprises a carrier film having an adhesive layer on one side and a coating layer on another side.
b. The carrier film is a plastic film, a metal foil, or a metal-plastic composite film.
c. The carrier film has a thickness in the range of 10 μm to 120 μm.
d. The adhesive layer has a thickness in the range of 10 μm to 80 μm, preferably 30 μm to 60 μm.
e. The adhesive layer has a uniform thickness.
f. The adhesive layer consists of a homogeneous adhesive mass.
g. The adhesive layer has an area in the range of 10 cm2 to 8 m2.
h. The coating layer has a thickness in the range of 20 μm to 150 μm, preferably from 30 μm to 90 μm, particularly preferably from 40 μm to 60 μm.

In a particular preferable manner, at least the immediately preceding features a. and b. and g. are implemented in combination with each other. In a preferred further development, features a. to d. and g. and h., in particular a. to e. and g. and h., and in a particularly preferred embodiment all features a. to h., are implemented in combination with one another.

Feature e. is particularly preferably implemented in combination with feature f. Uniform thickness is to be understood to mean that the adhesive layer is not locally weakened by microstructure channels for the removal of air or other microstructures. Preferably, it is formed by applying a homogeneous adhesive mass by means of a squeegee and accordingly has a substantially flat and uniform surface. The term "homogeneous" is understood to mean that the adhesive mass contains no particles, in particular visible particles.

The use of microstructure-free adhesive layers makes it possible to use adhesive films with very thin carriers and still obtain high-gloss "Class A surfaces." Within the above-mentioned range of 10 μm to 120 μm, carrier films with a thickness of 10 μm to 60 μm, in particular 10 μm to 40 μm, are particularly preferred, especially if the adhesive layer is free of the mentioned microstructures.

In particularly preferred embodiments, the system according to the invention is characterized by at least one of the following features a. to c.:

a. The system is configured for semi-automatic application of a film, in particular a coating film.
b. The system is configured for fully automatic application of a film, in particular a coating film.
c. The system is configured for integration into an industrial production line.

According to the aforementioned feature a., the system according to the invention can be used for a semi-automatic application of a film by manually performing one or more steps during the application. For example, the clamping of the foil into the framework of the system can be done manually. Furthermore, for example, the positioning and/or fixing to the component of the framework with the clamped foil can be done by hand. Furthermore, it can be provided that the guiding of the squeegee or of another application means in the rails of the framework is done by hand. For this purpose, for example, a corresponding handle can be attached to the application means, with which the application means is guided over the surface. This step is very easy to perform, since the path and, if necessary, the angle of the squeegee over the surface are predetermined by the system. So, even with this semi-automatic application, application errors are reliably avoided.

It is particularly preferred if one or more steps of this method are carried out in an automated manner, for example, by means of robot technology, that is known per se. In particular, in such embodiments, the method according to the invention using the described system is suitable for an industrial production, for example, automobile production.

A particular advantage of the system according to the invention is that, in accordance with the aforementioned feature b., it can also be configured for fully automatic application of the film. In particular, the guiding of the application means can readily be carried out automatically. The positioning and fixing of the framework to the component and the clamping of the film in the framework before the framework is mounted on the component can also be automated, for example, through the use of appropriate robotic devices. Overall, the system according to the invention is thus very well suited for industrial manufacturing, in particular in car body construction, for example, in automobile building.

In preferred embodiments, the system according to the invention is characterized by at least one of the following additional features:

a. The system is configured for applying a film, in particular a coating film, to a car body in automobile production.
b. The system is configured for applying a film, in particular a coating film, to a car body part in automobile production.
c. The system is configured for applying a film, in particular a coating film, to a roof of an automobile.
d. The system is configured for applying a film, in particular a coating film, to a hood of an automobile.
e. The system is configured for applying a film, in particular a coating film, to a tailgate of an automobile.
f. The system is configured for applying a film, in particular a coating film, to a fender of an automobile.
g. The system is configured for applying a film, in particular a coating film, to a spoiler of an automobile.

The aforementioned application possibilities of the system according to the invention, in accordance with the aforementioned features a. to g., permit error-free application of the corresponding films, wherein the particular advantage of the system according to the invention also lies above all in the fact that the system can be adapted to different geometries of the respective component to which the film is to be applied. In particular, even rather difficult geometries, which is to say geometries with various curvatures and bends, can be provided with a film using the system according to the invention with a very good quality of application.

The possible applications of the system according to the invention are not limited to the mentioned preferred examples in automobile production, but rather can also be used for other fields where a film must be applied with good quality.

A particular advantage of the system according to the invention is its adaptability. For example, the one or multiple application means are interchangeable, such that a suitable means can be selected for particular requirements, for example, a squeegee or a brush or a roller, depending on the geometry of the component to be processed. The appropriate contact pressure can also be adapted in each case. In addition, the framework of the system can be designed in such a way that it can be adapted in the manner of a modular system to the respective component in a few simple steps, in particular using system profiles. Furthermore, the air cushions provided in preferred embodiments also offer good adaptability to different geometries of the respective component.

The invention further comprises a method for applying a film, in particular a coating film, to the surface of a component, wherein the described system according to the invention is used for this method. This method comprises the following steps:

a. A system according to the above description is provided.
b. A film, in particular a coating film, is fixed in the framework of the system.
c. The component is provided.
d. The framework is positioned and/or fixed to the component such that the film is positioned over the surface to be coated.
e. The film is pressed onto the surface of the component by the at least one application means of the system.
f. The at least one application means is displaced along the rails of the framework of the system to apply the film to the surface.
g. The applied film is released from the framework.
h. The framework of the system is detached from the component and removed.

In a particularly preferred manner, the method according to the invention is suitable for the application of a self-adhesive coating film and, in particular, for a transfer coating film which is optionally provided with a carrier film which can be removed after the film has been applied to the surface of the component.

The particular advantages of the method according to the invention come into play above all in the application of films to large planar surfaces, such as a vehicle roof. Conventionally, the application of films, especially on large surfaces, is difficult, since the previous manual application of such films can easily lead to premature adhesion of the films to the surface, since the film cannot be held sufficiently well by hand prior to adhesion. The system according to the invention can, especially on such large surfaces, be used with particular advantage to ensure a clean application.

During the application of the film according to the invention, the squeegee is preferably guided over the surface in such a way that there is an acute angle between the surface of the component or the film and the squeegee. By guiding the squeegee in this way, the film can be pressed on in a particularly uniform manner without the formation of air pockets or the like.

In a particularly preferred manner, the required contact pressure is accomplished by means of the pressure cylinder or pressure cylinders. In other embodiments, however, it may also be provided that no pressure cylinders are provided and the contact pressure is applied, for example, by hand. In such cases, too, the use of the system according to the invention is particularly advantageous over purely manual application, since uniform guidance of the squeegee or, where appropriate, of another contact pressure medium is ensured by the rails on the framework of the system.

The embodiment of the method in which the carrier film is peeled off after application of the film is particularly preferred, since such a carrier film greatly facilitates handling of the film, especially a coating film. In this case, the sensitive film or the coating film itself does not need to be touched by a tool or by hand during application.

The film can, in particular, be clamped in the framework in such a way that, for example, small pins are arranged in a row on two opposite sides of the framework. The film has corresponding holes in the edge areas such that the film can be easily hooked into the framework by means of the pins. Alternatively, clamping rails on the opposite sides of the framework can, for example, be used. For the actual tensioning of the film, conventional tension springs can, for example, be used, which tension springs engage one of the sides of the framework on which the film is hung or clamped.

Preferably, for aligning and securing the framework to the component, three air cushions are provided on the framework, arranged at such points on the framework as to allow good positioning on the component in question. If, for example, the system according to the invention is to be used to apply a film to a vehicle roof, the air cushions can be attached to the framework in such a way that, hereby, a fixing to two vehicle uprights located on the right and left of the vehicle body and to a third point at the front or rear of the vehicle roof is possible. A firm and secure fixing of the framework to the component is very advantageous for the method according to the invention, since a certain pressure is exerted by the application means, for example, the squeegee, which should be absorbed by the stable fixing of the framework to the component such that the framework does not lift off.

For an automation of the system, the framework can be moved and positioned in a production line, for example, by means of a robotic arm or by means of a lowerable station, for example, on top of the corresponding car body.

In the design of the application means, it is expedient if the single or multiple application means are flexible such that they can adapt to the shape of the component during application, for example to curvatures in several directions, such as in the case of a car roof.

When applying the film with the system according to the invention, work is preferably carried out over the edges, and these transition points can, for example, subsequently be faced with strips. The method according to the invention can, for example, be used to apply a film to a vehicle body that has already been completely painted beforehand. A corresponding film can, for example, be applied to the vehicle roof. In principle, individual workpieces or components of the vehicle body can also be provided with a corresponding film in advance using the system according to the invention, before the assembly of the car body takes place. In this case, corresponding individual parts can be applied directly to the cathodic dip coating (CDP) before they are mounted on the body. Such a film application to individual parts is particularly advantageous in terms of energy savings, as previous paint coatings can be dispensed with.

The application of a coating film by means of the system according to the invention is suitable in principle for all cases in which a coating layer is applied to a substrate by means of a coating film. For example, the coating film can be used in an advantageous manner to produce multicolored car bodies, according, for example, to individual wishes. Furthermore, a film can also be applied in the intended car color, for example, when different surface qualities are involved, such as gloss, matte or satin. In general, a foil finish has a higher gloss finish than other finishes and can therefore be used, for example, as a black finish next to a panoramic roof that is also black, so as not to have any differences in gloss on the vehicle roof.

In addition, further surface features can be achieved by means of a film finish, such as stone chip protection.

The particular advantages of the system according to the invention come into play above all for large surfaces and in particular for large and curved surfaces, such as often occur in automobile production.

Further features and advantages of the invention will be apparent from the following description of embodiment examples in conjunction with the drawings. The individual features may be implemented individually or in combination with one another.

DETAILED DESCRIPTION OF THE EMBODIMENT EXAMPLES

Figure 1:
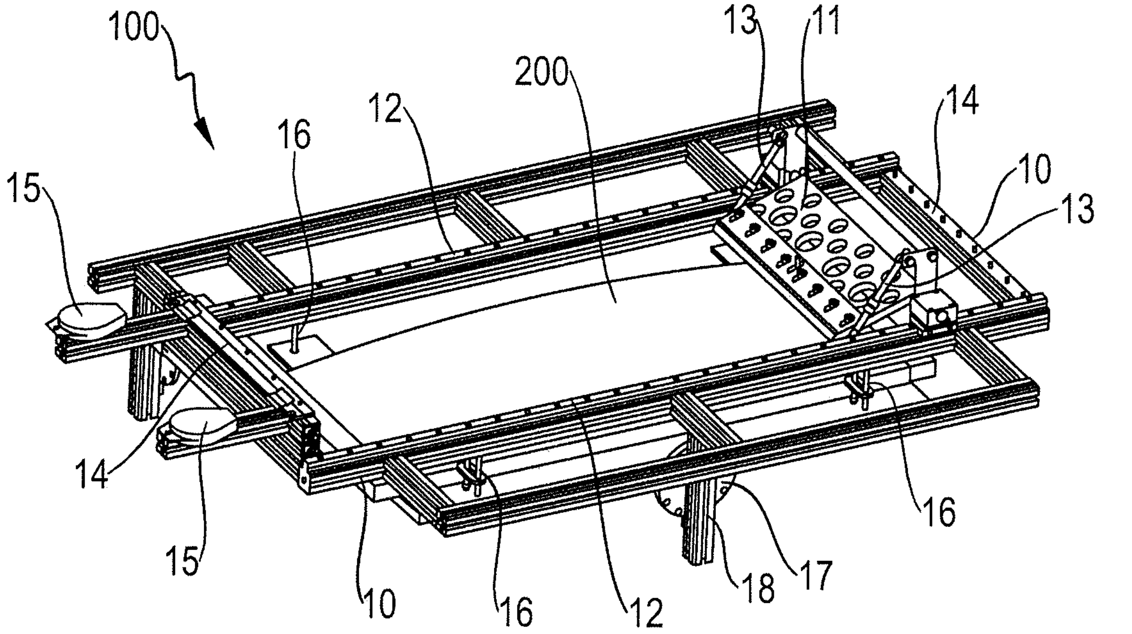
FIG. 1 shows an oblique top view of a system according to the invention in the initial position of the squeegee (without film clamped in place)

The particularly preferred embodiment of the system 100 according to the invention shown in FIG. 1 comprises a framework 10, which in this embodiment example is constructed of hollow aluminum profiles (Item-System). Furthermore, the system comprises an application means 11 in the form of a squeegee. Two parallel rails 12 are located on the two longitudinal sides of the framework 10. The squeegee or application means 11 is thereby suspended from a movable frame such that the squeegee can be moved along the rails 12 in the longitudinal direction of the framework 10. Two pressure cylinders 13 are arranged on both sides of the squeegee 11, by means of which pressure cylinders pressure can be exerted on the squeegee 11. A clamping rail 14 is provided on each of the two short sides of the framework 10, by means of which a film not shown here, in particular a coating film, can be hooked into the framework. The suspended film can be tensioned by means of two tension springs 15 located on one of the short sides of the framework 10.

In the manner indicated here, below the framework 10, there is a component 200, to whose surface a film is to be applied by means of the system 100 according to the invention. This component 200 can be, for example, the roof of a car body or another, preferably relatively large, planar and possibly curved component or a corresponding surface of a component.

For positioning and fixing the framework 10, or alternatively the system 100, onto the component 200, on the one hand, pins 16 are provided on the framework 10, which pins engage in existing openings or holes in the component 200. This provides an initial positioning of the framework 10 in the correct position with respect to the component 200. For further positioning and fixing, three circular air cushions 17 are provided on the framework 10. These air cushions 17 can be inflated or actuated pneumatically or, in other embodiments, hydraulically, such that these air cushions can be used to further align and fix the framework 10 to the component 200. The air cushions 17 can be adjusted in height, if necessary, by means of projecting struts 18 on the framework 10 in order to adjust the system or its correct position on the respective component.

Figure 2:
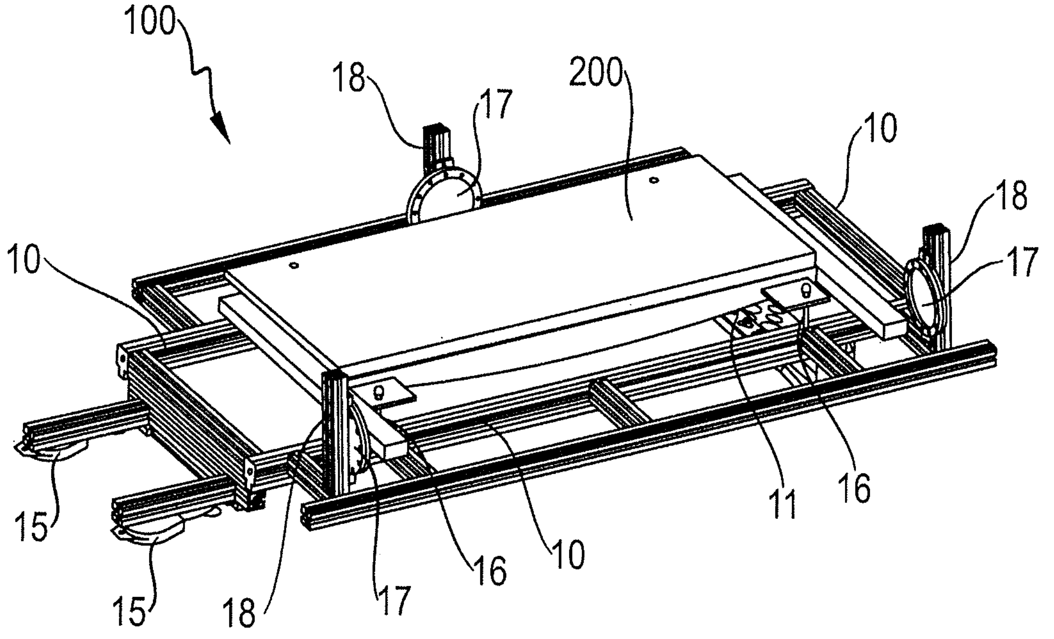
FIG. 2 shows an oblique view from below of the system of FIG. 1.

FIG. 2 shows the system according to the invention from FIG. 1 in an oblique view from below. In this view, the position of the three air cushions 17 and their points of application on the component 200 are elucidated. For the application case of the system for applying a film to a car roof, the air cushions 17 can, for example, be arranged on the framework 10 in such a way that two of the air cushions 17 engage the opposing vehicle uprights and the third air cushion 17 engages the car roof at the front or rear. Depending on the particular geometry of the component to be covered with a film, the framework 10 and, if necessary, the position of the fixing means 16, 17 can be adapted accordingly.

Figure 3:
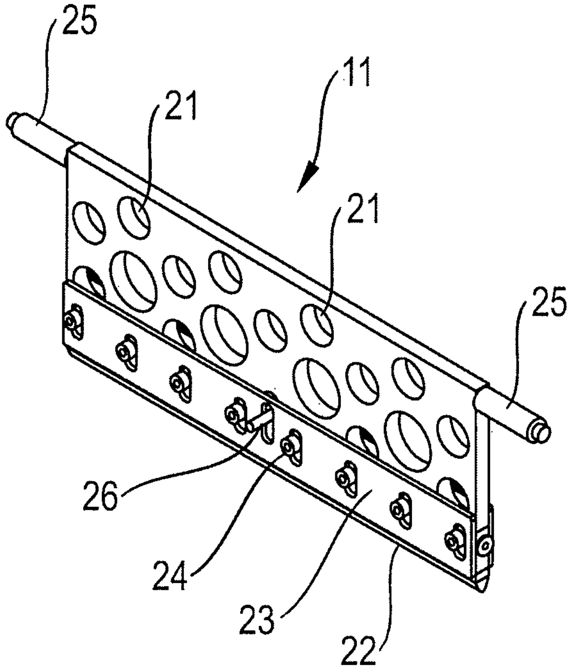
FIG. 3 shows a detailed drawing of a squeegee as a preferred embodiment of an application means of the system according to the invention.

FIG. 3 shows a detailed drawing of the squeegee 11. The squeegee forms the application means which is used to exert a uniform contact pressure distributed over the width of the squeegee during the application of the film to the surface of the component. The squeegee 11 has a rectangular shape and can be, for example, made of plastic. Various openings 21 are provided in the surface of the squeegee 11 in this embodiment, such that no counteracting air pressure is created when the squeegee is pressed onto the film. In the area of the squeegee 11 that comes into contact with the film 20 to be pressed on, a felt 22 or, if necessary, another textile fabric is provided, which is attached to the actual body of the squeegee 11 by means of, for example, sheet metal rails 23. The sheet metal rails 23 can be attached to the body of the squeegee 11 by means of screw connections 24. The felt 22 ensures that there is no damage to the film during application. By means of the mounting pins 25 on both sides, the squeegee 11 can be suspended in a corresponding frame in a pivotable manner in the system, as shown in FIG. 1.

At the lower edge of the squeegee 11 shown here, which comes into contact with the film, a pneumatically or hydraulically operable element, for example, a hose, not shown in more detail here, can be guided below the felt 22. This hose can be actuated by means of the connection 26, for example, by means of compressed air, such that the contact pressure exerted by the squeegee on the film can be varied during the application process.

Figure 5:
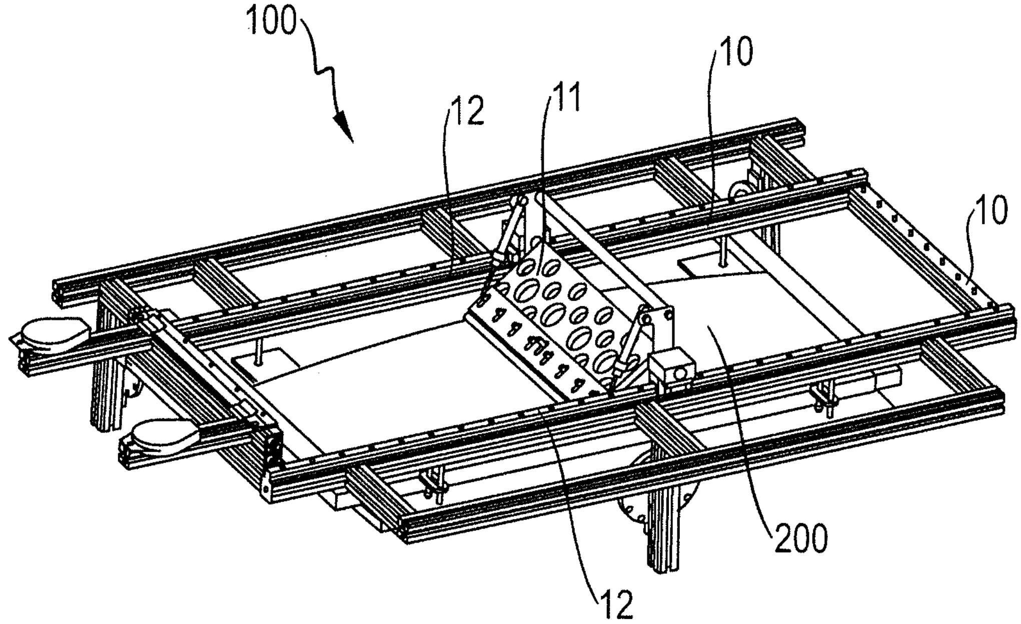
FIG. 5 shows an oblique top view of the system of FIG. 4, in the middle position of the squeegee (without film)
Figure 6:
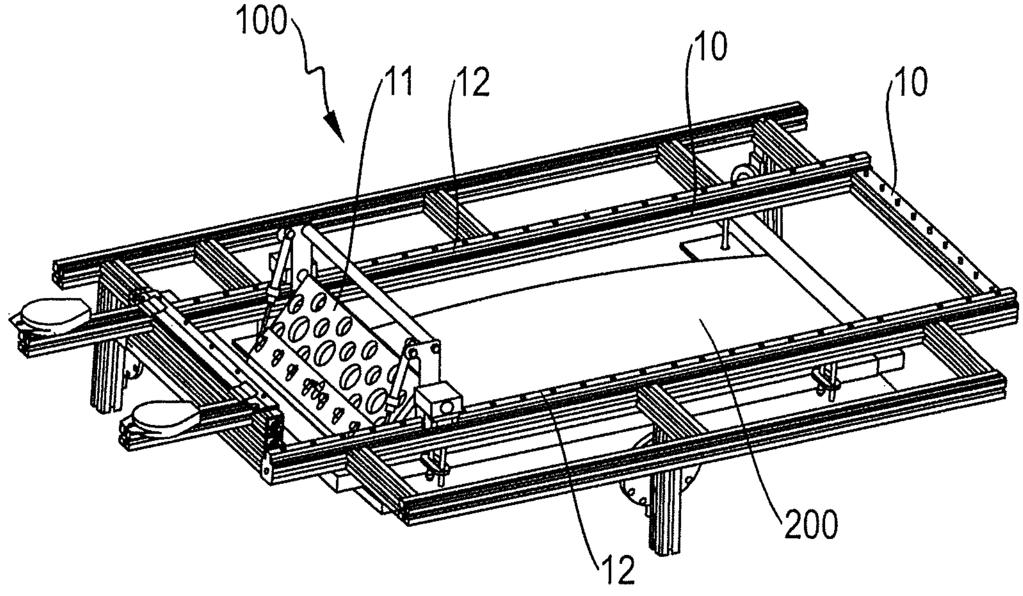
FIG. 6 shows an oblique top view of the system from FIG. 4, in end position of the squeegee (without film)

On the basis of FIG. 4 to FIG. 6 described below, the process of applying a film to a component using the system 100 according to the invention will be explained in more detail. The system 100 corresponds to the system explained with reference to FIG. 1. The corresponding elements are therefore provided with the same reference signs.

Figure 4:
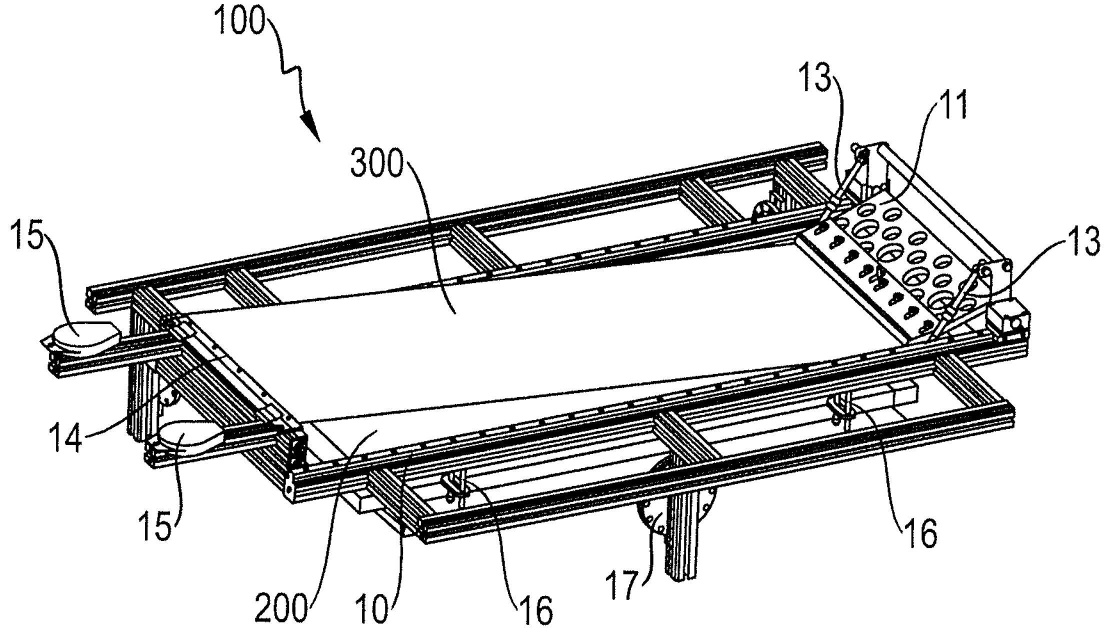
FIG. 4 shows an oblique top view of a system according to the invention, in the starting position of the squeegee, with the film clamped in place.

In the illustration in FIG. 4, the squeegee 11 is in the starting position. A coating film 300 is clamped in the framework 10 of the system by means of the clamping rails 14, which are located on both short sides of the framework. The coating film 300 has been pretensioned in advance by means of the tension springs 15 in such a way that it cannot initially touch the surface of the underlying component 200. After insertion and tensioning of the coating film 300 in the framework, the framework was positioned and fixed to the component by inserting the pins 16 of the framework into corresponding holes in the component. A final fixation and fastening, in the correct position, to the component was done by means of the air cushions 17.

The squeegee 11 is then lowered by actuating the pressure cylinders 13, which form the lateral mounting of the squeegee 11, and thus brought into contact with the coating film 300. A contact pressure is exerted on the coating film 300 in such a way that the coating film 300 is pressed firmly onto the surface of the component 200.

Now, the squeegee is methodically moved in the direction of the longitudinal extension of the framework along the two lateral rails 12 in such a way that the film is continuously pressed against the surface of the component 200 over its entire longitudinal extension. FIG. 5 shows a position of the squeegee 11 in an intermediate position, and FIG. 6 shows the final position of the squeegee 11 after the coating film 300 has been pressed against the surface of the component over its entire longitudinal extension. For technical drawing-related reasons, the film 300 itself is not shown in the illustrations in FIG. 5 and FIG. 6.

The invention claimed is:

1. A system for applying a coating film to a surface of a component to be painted, comprising:
(a) a framework positioned and fixed to the component to be painted;
(b) a squeegee with which a contact pressure is exerted on the coating film during the application of the coating film;
(c) two rails along which the squeegee can be moved;
(d) a device in the framework for fixing the coating film;
(e) a pin and/or a cushion for fixing the framework to the component; and
(f) a tension spring positioned on the framework and configured to tension the coating film.

2. The system according to claim 1, wherein:
(a) the framework comprises a rectangular basic shape;
(b) the two rails comprise two opposite side parts of the framework;
(c) the framework comprises the two rails fixed on two opposite side parts of the framework;
(d) the two rails comprise linear rails; and/or
(e) the two rails are parallel to each other.

3. The system according to claim 1, wherein:
(a) the framework comprises a variably adjustable framework;
(b) the framework comprises system profiles; and/or
(c) the framework comprises aluminum profiles.

4. The system according to claim 1, wherein:
(a) the brush comprises a rotatable brush; and/or
(b) the roller comprises a rotatable roller.

5. The system according to claim 1, wherein:
(a) the squeegee is configured for movement along the two rails and guidance over the coating film at a leading, acute angle during the application of the coating film;
(b) the squeegee is covered with a textile fabric in an area that comes into contact with the coating film during the application of the coating; and/or
(c) the squeegee comprises a pneumatically or hydraulically actuatable element in an area that comes into contact with the coating film during the application of the coating film.

6. The system according to claim 1, wherein:
(a) the pressure cylinder is configured to press the squeegee onto the surface to be painted;
(b) the pressure cylinder comprises a hydraulic cylinder; and/or
(c) the pressure cylinder comprises a pneumatic cylinder.

7. The system according to claim 1, further comprising a pressure sensor system.

8. The system according to claim 1, wherein the cushions comprise actuatable cushions.

9. The system according to claim 8, wherein the actuatable cushions comprise inflatable air cushions.

10. The system according to claim 1, wherein the device further comprises a clamp.

11. The system according to claim 1, wherein the coating film comprises a self-adhesive coating film, a transfer coating film, a color-imparting layer, and/or a clear coat layer.

12. The system according to claim 1, wherein the system is configured for semi-automatic application of the coating film, fully automatic application of the coating film, and/or integration into an industrial production line.

13. The system according to claim 1, wherein the component comprises:
(a) a car body in automobile production;
(b) a car body part in automobile production;
(c) a roof of an automobile;
(d) an engine hood of an automobile;
(e) a tailgate of an automobile;
(f) a fender of an automobile; and/or
(g) a spoiler of an automobile.

14. A method for applying a coating film to a surface of a component using the system of claim 1, comprising:
(a) fixing the coating film in the framework; and
(b) moving the squeegee along the two rails to press the coating film onto the surface of the component.

15. The method of claim 14, further comprising positioning the framework so that the coating film is positioned over the surface of the component.

16. The method of claim 14, further comprising releasing the film from the framework.

17. The method of claim 14, wherein the coating film comprises a transfer coating film with a carrier film, and wherein the carrier film is peeled off after application of the transfer coating film.

* * * * *